2,994,639
ANTIBIOTIC COMPOSITION

Robert F. Carper, Pavilion Township, Kalamazoo County, and David H. Gregg and Carl J. Lintner, Kalamazoo, Mich., assignors to The Upjohn Company, Kalamazoo, Mich., a corporation of Michigan
No Drawing. Filed Dec. 16, 1958, Ser. No. 780,684
3 Claims. (Cl. 167—55)

This invention relates to an antibiotic composition and more particularly to a flavored dry granulated form of tetracycline and novobiocin suitable for reconstitution by the addition of water prior to oral administration.

The broad spectrum antibiotic activity of tetracycline in both human and veterinary medicine is well documented in the literature. The potent antistaphylococcic properties of novobiocin as well as its effectiveness against various other pathogenic organisms have likewise become well recognized in both human and veterinary medicine. It has been discovered that novobiocin is not only capable of complementing and enhancing the antibiotic activity of tetracycline but that a pronounced synergism is exhibited by combinations of the two antibiotics against certain organisms only moderately susceptible to their individual actions. Moreover, combinations of novobiocin have been shown to slow the development of resistance by certain pathogens.

It is therefore desirable to provide a composition of both of those antibiotics in oral dosage form, and especially to provide a composition that can be administered in fluid form for use in a situation in which the patient is unable to swallow a solid dosage form as, for example, infants, elderly people, or adults who are unconscious. However, compositions when manufactured and supplied in fluid forms such as syrups, suspensions, and elixirs, suffer disadvantages due to instability and the changes which accrue due to the passage of time or storage. In the particular case of novobiocin and tetracycline, the antibiotics lose their activity at a greatly increased rate in liquid compositions as opposed to dry compositions, such as tablets, pills and capsules. Also the liquid forms of tetracycline discolor and become unattractive; the suspended particles are subject to crystal growth which makes the composition grainy or gritty and less acceptable from the standpoint of palatability.

It is therefore particularly advantageous to supply an "elegant" composition of novobiocin and tetracycline which is in dry form during storage and can be easily and quickly converted to an orally acceptable fluid before administration.

The present invention comprises a dry, storage-stable granulation which can be easily reconstituted into an elegant, orally acceptable fluid dosage form by the addition of water, the composition comprising a granulation of therapeutic amounts of tetracycline free base and novobiocin calcium acid, sugar, sorbitan trioleate, an alkali metal metaphosphate and suitable sweetening and flavoring agents. Advantageously the composition can include a buffering agent such as potassium phosphate tribasic and a sulfur-containing reducing agent such as sodium metabisulfite.

In the pharmaceutical industry an "elegant" preparation is one which is relatively free of objectionable features which may lead to criticism of the product by those concerned with its use. An elegant preparation should be of good stability, color, taste, consistency and possess other qualities which make it readily acceptable by the patient, the doctor, the pharmacist, the distributors and others who must handle the product.

The provision of an elegant composition met with many unexcepted problems and difficulties which could not be anticipated. These problems and difficulties were solved, however, by the composition of the present invention. The problems and difficulties which were solved by the present invention are: foam (i.e., when water is added to an ordinary granulation of the indicated active ingredients a large amount of foam is produced which occupies a considerable portion of the space in the bottle, making it impossible to add the correct amount of water for reconstitution); air entrapment (i.e., air is occluded in the solution when water is added which, like foam, makes the addition of the correct amount of water impossible); dispersion (i.e., the insoluble antibiotics must be uniformly distributed within the reconstituted product if uniform dosage amounts are to be measured); and reconstitution time (i.e., the granules must be quickly reconstituted to make up an administerable product upon the addition of water, i.e., within a few minutes time). To make the reconstituted product orally acceptable, it must not be grainy, gritty or lumpy and must be pleasantly flavored.

All percentages given in the specification and claims are expressed as the weight/weight (w./w.) basis unless otherwise specified.

The tetracycline in the composition of the present invention is the free base and the novobiocin is the calcium acid salt. The antibiotics are present in a preferred ratio of 1:1 or 2:1 with the tetracycline predominating. This ratio can be varied, although the preferred ratios follow the current trend of therapeutic use. The lower limit of concentration is the therapeutically effective amount of antibiotic. The maximum concentration in the composition is set in view of the reconstituted product, i.e., when reconstituted the suspension should not contain more than about 20% w./v. of suspended antibiotic. Above 20% w./v., the reconstituted product is too thick for practical use and the antibiotics are difficult to suspend uniformly. The preferred concentrations are as shown in Examples 1 and 2.

Suitable sugars include sucrose, glucose, fructose, and the like with sucrose being preferred. The sugar concentration can be from about 25% to about 80% of the composition with about 75% being preferred. This concentration range for the dry granules produces, after reconstitution, a syrup with from about 10 to 30% w./v. of sugar.

Sorbitan trioleate is included in the composition in a preferred concentration of about 0.4% and can be varied in concentration from about .05 to about 2%. The concentration of sorbitan trioleate is changed and follows the variations of antibiotic concentration, i.e., the more antibiotic in the composition, the greater the sorbitan trioleate concentration.

The alkali metal metaphosphate can be sodium or potassium metaphosphate and is present in an amount preferably about equal to the tetracycline present. The metaphosphate is advantageously present as an adjuvant to the therapeutic efficacy of tetracycline. It was quite unexpectedly discovered, that while other phosphate salts are effective as adjuvants to tetracycline, sodium and potassium metaphosphate have the additional quality of reducing the amount of foam produced when the granules are reconstituted.

As used in the present specification the term potassium metaphosphate is used to mean the potassium hexametaphosphate of commerce having the approximate formula $(KPO_3)_6$. Similarly by sodium metaphosphate is meant the sodium hexametaphosphate of commerce.

The particular sweetening agent and flavor used can be chosen to suit the preference of taste. Aside from the sweetening due to the sugar present, it is advantageous to use an artificial sweetner such as sodium saccharin and is preferably added in a concentration of about 1.5%. Flavoring agents that can be used include oil of lime, orange, lemon, grenadine, wintergreen, peppermint and spearmint. The flavoring oils can be included singly or in combination at a preferred concentration of about 0.5%.

It is advantageous to include in the composition a sulfur-containing reducing agent for reason of its ability to stabilize the tetracycline after reconstitution with water. Preferably a water-soluble salt of sulfur-containing acids such as sulfurous acid and hydrosulfurous acid and their aldehyde addition products, such as sodium metabisulfite, sodium bisulfite, sodium formaldehyde sulfoxylate and the like.

The concentration of the sulfur-containing reducing agent can vary depending upon the amount of tetracycline present and the particular reducing agent used. When the preferred sodium metabisulfite is used, a concentration between about .05 and about 1% is operative, although between about 0.1 and about 0.5% is preferred.

It is advantageous that, after the granules are reconstituted with water, the aqueous suspension have a pH between 6.5 and 7.5. Above pH 7.5 the tetracycline base is converted to a soluble, hence water unstable, form such as the sodium and potassium salts. Below pH 6.5 the calcium novobiocin is converted to novobiocin free acid which crystallizes in a form which is clinically inactive. It is therefore desirable to include in the composition a buffering agent which is capable of maintaining the pH of the reconstituted product between 6.5 and 7.5. The preferred buffering agent is potassium phosphate tribasic. The amount of potassium phosphate tribasic which is necessary to provide the proper pH varies with the types and amounts of the other ingredients and the amount of water intended to be added for reconstitution, but is easily determined for each individual case beforehand by preparing a trial batch of the particular composition and adding the buffering agent until the correct amount is determined.

The first step in the preparation of the composition of the present invention is the reduction to suitable particle size of the various solid ingredients. Examples of the many ways in which comminution can be carried out can be found in chapter 11 of Remington's Practice of Pharmacy, 11th edition, Mack Publishing Company, 1956.

The preferred particle size of the various ingredients are:

Tetracycline—
    99% <20 microns
    75% <10 microns
Calcium acid novobiocin—
    99% <15 microns
    75% <10 microns
Sugar—
    99% <120 microns
    75% <30 microns
Potassium metaphosphate—
    99% <100 microns
    75% <50 microns A preferred method of reducing the particle size of the antibiotics and potassium metaphosphate is by use of an air micronizer; particles so reduced by this method will hereinafter be described as "micronized."

Sucrose is commercially available in a form called "powdered sugar" or "confectioners sugar" which is suitably comminuted.

The remaining solid ingredients are reduced to a particle size that passes through a No. 60 size screen.

The solid ingredients when of suitable size are blended together until uniformly dispersed. Water is sprayed over the powder mixture in sufficient amount to wet but not an excessive amount that will dissolve an appreciable amount.

The granules are formed by forcing the wetted mixture through a screen. The preferred screen size is No. 12. After formation, the granules are dried, preferably in air at about 120° F.

When dried the granules are filled into suitable containers. Advantageously, a predetermined amount is placed in a graduated or unit size glass bottle. Reconstitution is easily accomplished by filling the bottle with water, obviating the need to add a measured amount of water.

The following examples are illustrative of the compositions of the present invention and are not to be construed as limiting.

EXAMPLE 1

| | Gms. |
|---|---|
| Novobiocin acid calcium, micronized | 82.5 |
| Tetracycline base, micronized | 165 |
| Potassium metaphosphate, micronized | 120 |
| Sodium metabisulfite, No. 60 screen | 6 |
| Potassium phosphate tribasic,[1] No. 60 screen | 3 |
| Saccharin sodium, No. 60 screen | 24 |
| Sucrose, powdered | 1200 |
| Sorbitan trioleate | 6 |
| Flavoring oils | 7.2 |
| Deionized water, q.s. | |

[1] Correct for moisture to anhydrous basis.

The solid ingredients are reduced to appropriate size as indicated above and mixed together until uniformly distributed. The powder mixture is sprayed with sufficient deionized water to moisten and the wetted mixture forced through a size 12 screen. The resulting granules are dried in air heated to 120° F. The flavors are dissolved in the sorbitan trioleate and sprayed over the dried granules. The granules are then filled in suitable glass containers.

Advantageously, a two ounce prescription bottle is filled with about 16 gm. of the granules. When sufficient water is added to fill the bottle and the bottle shaken several times, the reconstituted product is formed. The reconstituted product contains in each 5 cc. about 137 mg. of tetracycline base and about 68 gm. of novobiocin acid calcium.

EXAMPLE 2

| | Gms. |
|---|---|
| Novobiocin acid calcium, micronized | 82.5 |
| Tetracycline base, micronized | 82.5 |
| Potassium metaphosphate, micronized | 120 |
| Sodium metabisulfite, No. 60 screen | 6 |
| Potassium phosphate tribasic,[1] No. 60 screen | 3 |
| Saccharin sodium, No. 60 screen | 24 |
| Sucrose, powdered | 1200 |
| Sorbitan trioleate | 6 |
| Flavoring oils | 7.2 |
| Deionized water, q.s. | |

[1] Correct for moisture to anhydrous basis.

The solid ingredients are reduced to appropriate size as indicated above and mixed together until uniformly distributed. The powder is sprayed with sufficient deionized water to moisten and the wetted mixture forced through a size 12 screen. The resulting granules are dried in air heated to 120° F. The flavors are dissolved in the sorbitan trioleate and sprayed over the dried granules. The granules are then filled in suitable glass containers.

Advantageously, a two ounce prescription bottle is filled with about 15 gm. of the granules. When sufficient water is added to fill the bottle and the bottle shaken several times, the reconstituted product is formed. The reconstituted product contains in each 5 cc. about 68 mg. of tetracycline base and about 68 mg. of novobiocin acid calcium.

EXAMPLE 3

| | Gms. |
|---|---|
| Novobiocin acid calcium micronized | 600 |
| Tetracycline base, micronized | 600 |
| Potassium metaphosphate, micronized | 500 |
| Sodium metabisulfite, No. 60 screen | 6 |
| Potassium phosphate tribasic,[1] No. 60 screen | 3 |
| Saccharin sodium, No. 60 screen | 24 |
| Sucrose, powdered | 600 |
| Sorbitan trioleate | 50 |
| Flavoring oils | 7.2 |
| Deionized water, q.s. | |

[1] Correct for moisture to anhydrous basis.

The solid ingredients are reduced to appropriate size as indicated above and mixed together until uniformly distributed. The powder is sprayed with sufficient deionized water to moisten and the wetted mixture forced through a size 12 screen. The resulting granules are dried in air heated to 120° F. The flavors are dissolved in the sorbitan trioleate and sprayed over the dried granules. The granules are then filled in suitable glass containers.

Advantageously, a two ounce prescription bottle is filled with about 24 gm. of the granules. When sufficient water is added to fill the bottle and the bottle shaken several times, the reconstituted product is formed. The reconstituted product contains in each 5 cc. about 500 mg. of tetracycline base and about 500 mg. of novobiocin acid calcium.

It is to be understood that the invention is not to be limited to the exact details of operation or compositions shown and described, as obvious modifications and equivalents will be apparent to one skilled in the art, and the invention is therefore to be limited only by the scope of the appended claims.

What is claimed is:

1. A dry storage-stable granulation of tetracycline and novobiocin which can be reconstituted into an elegant orally-acceptable fluid dosage form by the addition of water, comprising a granulation of up to about 50% of finely divided tetracycline free base and novobiocin calcium acid, from about 25% to about 80% of sugar, from about 0.5% to about 2% sorbitan trioleate, from about 1% to about 25% of an alkali metal hexametaphosphate and suitable sweetening and flavoring agents.

2. A dry storage-stable granulation of tetracycline and novobiocin which can be reconstituted into an elegant orally-acceptable fluid dosage form by the addition of water, comprising a granulation of about 5% novobiocin acid calcium, about 10% tetracycline free base, about .2% potassium phosphate tribasic, about 7.5% potassium hexametaphosphate, about .4% sodium metabisulfite, about 75% sucrose, about .4% sorbitan trioleate, and suitable sweetening and flavoring agents.

3. A dry storage-stable granulation of tetracycline and novobiocin which can be reconstituted into an elegant, orally-acceptable fluid dosage form by the addition of water, comprising a granulation of about 5.3% novobiocin acid calcium, about 5.3% tetracycline free base, about .2% potassium phosphate tribasic, about 8% potassium hexametaphosphate, about .4% sodium metabisulfite, about 78% sucrose, about .4% sorbitan trioleate, and suitable sweetening and flavoring agents.

References Cited in the file of this patent

UNITED STATES PATENTS 2,795,528    Buckwalter    June 11, 1957

OTHER REFERENCES

Seneca: Antibiotics Annual, 1956–1957, Medical Encyclopedia, Inc., Feb. 20, 1957, pp. 175–179.

Lin et al.: Antibiotic Medicine and Clinical Therapy, vol. IV, No. 1, January 1957, pp. 35–39.